United States Patent [19]

Bureau et al.

[11] 4,173,215
[45] Nov. 6, 1979

[54] APPARATUS FOR STEAMING FOODS

[75] Inventors: Jean Y. Bureau, Dollard-des-Ormeaux; Bernard Charlebois, Montreal, both of Canada

[73] Assignee: Mscan Metal Canada Limitee, Montreal, Canada

[21] Appl. No.: 928,906

[22] Filed: Jul. 28, 1978

Related U.S. Application Data

[63] Continuation of Ser. No. 857,683, Dec. 5, 1977, abandoned.

[51] Int. Cl.² .......................... A21B 1/08; A47J 27/04
[52] U.S. Cl. ...................................... 126/369; 99/468; 99/476; 219/401
[58] Field of Search ................. 99/467, 468, 474, 476, 99/483; 126/369, 369.1, 369.2, 348, 377, 381, 382; 219/401

[56] References Cited

U.S. PATENT DOCUMENTS

| | | | |
|---|---|---|---|
| 1,756,992 | 5/1930 | Quiggle | 34/13 |
| 2,025,333 | 12/1935 | Richheimer | 126/377 |
| 2,540,924 | 2/1951 | Young | 126/369 |
| 2,574,950 | 11/1951 | Ben-Ami | 126/20 X |
| 2,636,430 | 4/1953 | Brown | 99/470 |
| 2,750,937 | 6/1956 | Sudlund | 126/369.2 |
| 3,077,530 | 2/1963 | Chase | 219/401 |
| 3,800,778 | 4/1974 | Lohr | 99/468 |
| 3,827,346 | 8/1974 | Tropp | 99/474 |

Primary Examiner—Robert W. Jenkins
Attorney, Agent, or Firm—Raymond A. Robic; Arthur Schwartz

[57] ABSTRACT

An apparatus for steaming food at substantially atmospheric conditions. This apparatus comprises a steam chamber means for filling the chamber with steam, which filling means comprises means for introducing water into the bottom of the steam chamber, and heating means outside the steam chamber for heating the water in the steam chamber to produce steam; means for allowing steam to escape from the chamber to maintain substantially atmospheric conditions in the chamber; a condensing chamber for the escaping steam; means in the condensing chamber for spraying water on the steam to condense it; means for draining the water and condensed steam from the condensing chamber; and means for controlling the heating means and the filling means, which control means comprises a sensor for sensing the temperature of the water and condensed steam in the condensing chamber.

19 Claims, 5 Drawing Figures

APPARATUS FOR STEAMING FOODS

This is a continuation of application Ser. No. 857,683, filed Dec. 5, 1977, now abandoned.

The present invention relates to an apparatus for steaming foods.

It is known to steam food to cook it, or to heat food that is already cooked. Much of the steam cooking or heating is, however, done at a pressure which is above atmospheric pressure. High steam pressures can result in some foods being overcooked, with a loss in nutritional values. High steam pressures can also result in kitchen accidents due to mishandling of the pressurized cooking unit. Further, high steam pressures require cookers of high strength construction, thus increasing their cost.

It is known to provide a device for steaming foods at pressures which can range from subatmospheric to a pressure above atmospheric. Such a device is shown in U.S. Pat. No. 3,800,778 for example. This device can be used to cook foods at a subatmospheric pressure to avoid overcooking. However this device still requires a strengthened vessel for cooking at subatmospheric or above atmospheric pressures. It can still also present a hazard in cooking. Further, this device requires means for providing a vacuum.

It is the purpose of the present invention to provide an apparatus for steaming foods which operates at generally atmospheric pressure. Such an apparatus is safe to operate, and need not be specifically constructed to withstand high pressure differentials. The apparatus is effective for cooking or heating foods, and minimizes overcooking of the food.

The invention is particularly directed toward an apparatus for steaming foods which comprises a steam chamber; means for filling the chamber with steam, which filling means comprises means for introducing water into the bottom of the steam chamber, and heating means outside the steam chamber for heating the water in the steam chamber to produce steam; means for allowing steam to escape from the chamber to maintain substantially atmospheric conditions in the chamber; a condensing chamber for the escaping steam; means in the condensing chamber for spraying water on the steam to condense it; means for draining the water and condensed steam from the condensing chamber; and means for controlling the heating means and the filling means, which control means comprises a sensor for sensing the temperature of the water and condensed steam in the condensing chamber.

The invention will now be described in detail having reference to the accompanying drawings in which.

Figure 2:
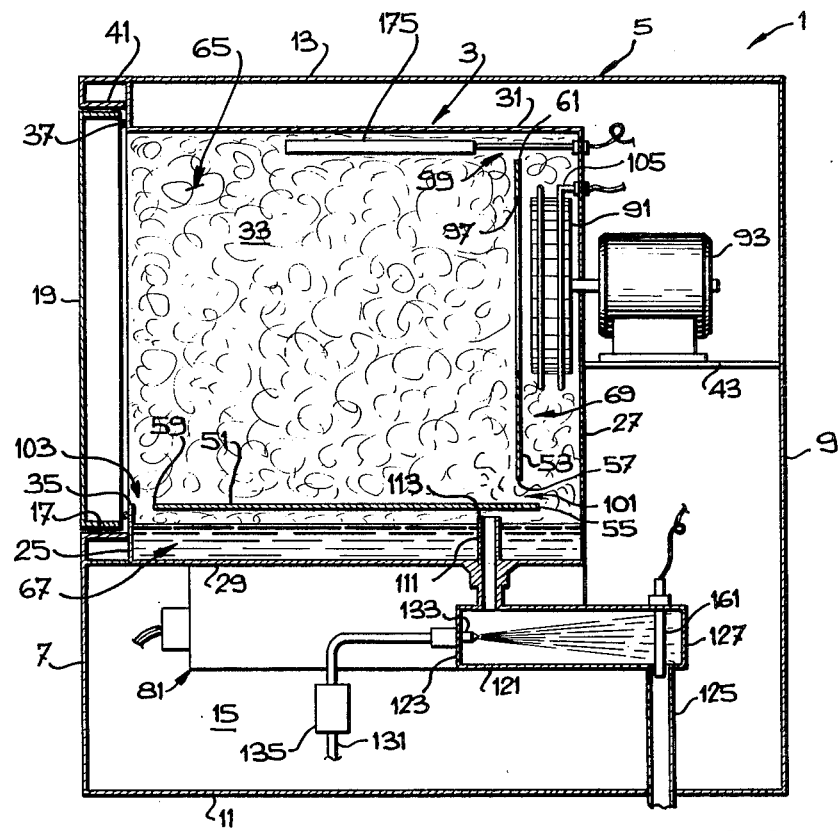
FIG. 2 is a cross-section view of the oven taken along line 2—2 of FIG. 1.
Figure 1:
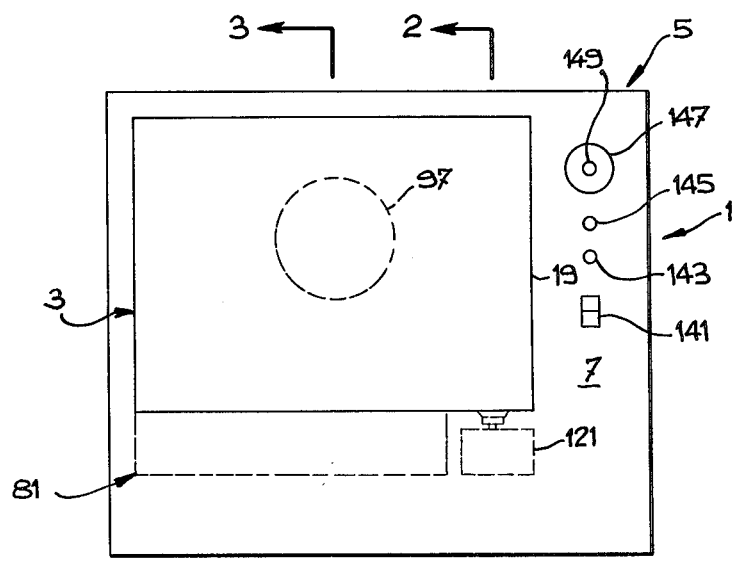
FIG. 1 is a front view of the steam oven.
Figure 3:
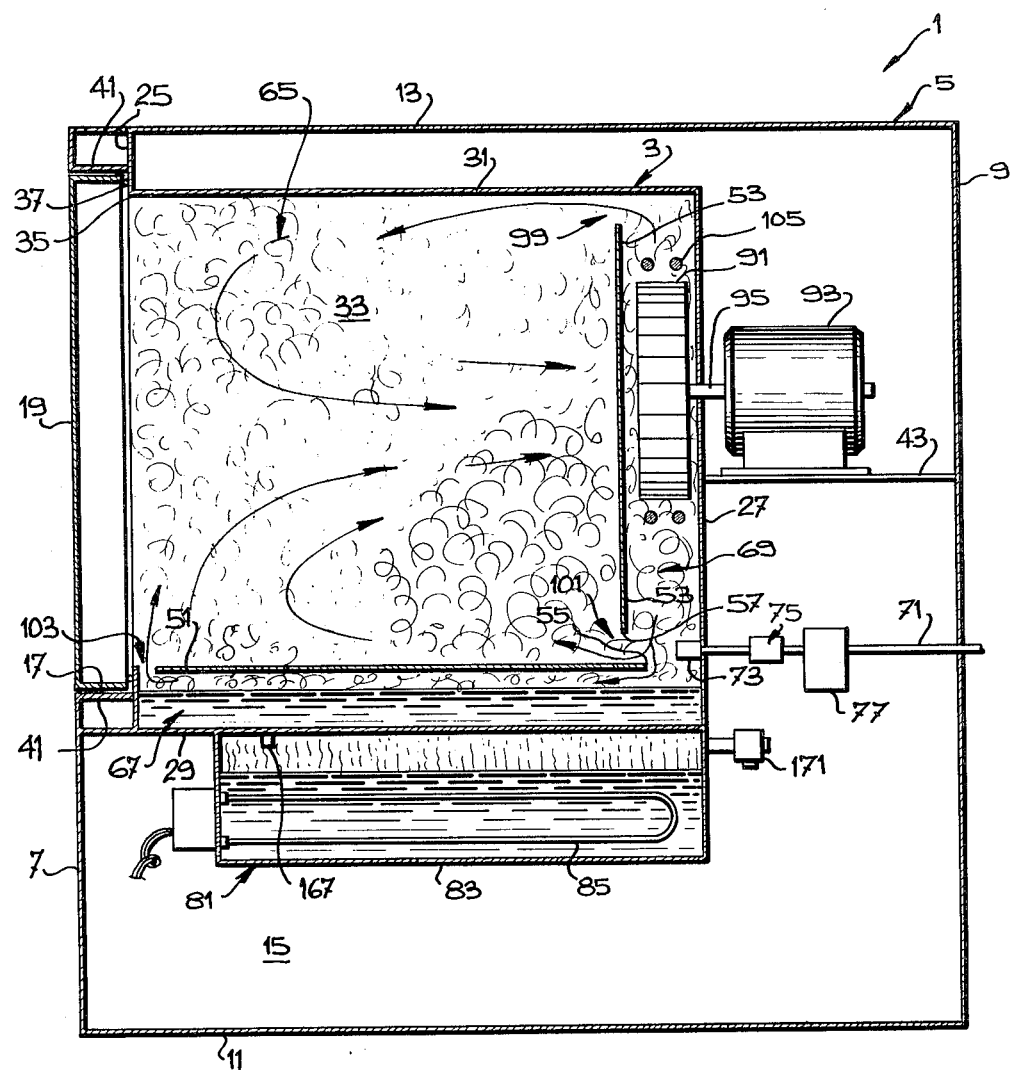
FIG. 3 is a cross-section view of the oven taken along line 3—3 of FIG. 1.

The steaming apparatus 1 of the present invention, as shown in FIGS. 1, 2 or 3, has a steaming unit 3 mounted in a cabinet 5. The cabinet 5 is generally rectangular in shape and has a front wall 7, a back wall 9, a bottom wall 11, a top wall 13, and sidewalls 15. An opening 17 is provided in the front wall 7 of the cabinet, to one side thereof, to provide access to the steaming unit 3. A door 19 closes the opening 17.

The steaming unit 3 is also generally rectangular in shape and has a front wall 25, a back wall 27, a bottom wall 29, a top wall 31 and sidewalls 33. An opening 35 in the front wall 25 provides access to the unit 3. This opening 35 is aligned with the opening 17 of the cabinet 5. The door 19 also closes the opening 35, bearing against a seal 37 on the front wall 25 of unit 3, which seal 37 encircles the opening 35.

The steaming unit 3 can be fixed in place within the cabinet 5 with the aid of front braces 41 joining the front wall 7 and 25 of the steaming unit and cabinet together and a back brace 43 joining the back walls 9, 27 together. Suitable insulation can surround the unit 3 within the cabinet 5.

The steaming unit 3 has a bottom panel 51 within it, which is spaced at a short distance above the bottom wall 29, and a back panel 53 which is spaced at a short distance in from the back wall 27. The lower edge 57 of back panel 53 is close but not joined to the bottom panel 51. Also, the front edge 59 of the panel 51 is close but not joined to the front wall 25 and the top edge 61 of the panel 53 is close but not joined to the top wall 31. While panels 51 and 53 are fixed to sidewalls 33 they stand short of them to define steam passages such as 101 and 102.

The space bounded by the panels 51 and 53, the top wall 31, the front wall 25, the door 19 and the sidewalls 33 define a steaming chamber 65. The space between the bottom panel 51 and the bottom wall 29 of the steaming unit 3 provides a steam generating chamber 67. The space between the back panel 53 and back wall 27 provide a steam circulating chamber 69.

The steaming chamber 65 receives the food to be cooked or heated. The food can be placed on racks mounted on supports (not shown) in the chamber 65. The steam generating chamber 67 receives water from a supply line 71 passing through the cabinet back wall 9 and the steaming unit back wall 27. The supply line 71 is connected to a filler nozzle 73 at the top rear end of the chamber 67. The nozzle 73 fills automatically the bottom of the chamber 67 with water through a solenoid valve 77 and a flow control device 75 in line 71. The operation of the solenoid valve 77 is controlled by the heating means 81, referred to hereinafter.

Heating means 81 are provided for heating the water in chamber 67 to generate steam. The heating means 81 comprise a closed heating chamber 83 adjacent the bottom wall 29 of the steaming unit 3. The chamber 83 is sealed with a subatmospheric pressure therein. The outside of the chamber can be suitably insulated. The heating chamber 83 is partially filled with a liquid such as water and electrical heaters 85 are immersed in the liquid to heat it to generate steam, which through conduction through the bottom wall 29 of the steaming unit, heats the water in the steam generating chamber 67. With the chamber at subatmospheric pressure, the heating means operates quite rapidly to generate steam. Of course, other conventional heating means could be employed to heat the water in the steam generating chamber 67 instead of the heating chamber 83.

A fan 91 is mounted within the steam recirculating chamber 69. The fan 91 is operated by a motor 93, mounted on the back brace 43 to the rear of steaming unit 3. The motor 93 runs the fan 91 through a shaft 95 which passes through the back wall 27. An inlet opening 97 in the back panel 53 directs steam from the steaming chamber 65 to the fan 91. The fan 91 distributes the steam to the top, bottom and sides of recirculating chamber 69 and back into the steaming chamber 65 through two openings 99 and 101, the aforesaid passages between the panels 51, 53 and the sidewalls 33. The steam also is distributed through the steam generating chamber 67 and back into the steaming chamber 65 through an opening 103 adjacent the front edge 59 of the bottom panel 51 as well as through the aforesaid passages between the panel 51 and the sidewalls 33. Heaters 105 encircle the fan 91 to heat and dry the steam as it is circulated.

A vent 111 is provided to permit the steam to escape from the steaming unit 3 so as to have substantially atmospheric operating conditions within the steaming unit 3. The vent 111 comprises a vertical tube extending through the bottom wall 29 of the unit 3 in the steam generating chamber 67. The inlet 113 of the vent tube 111 is located to be above the upper level of the water within the chamber 67.

The vent tube 111 connects to a condensing chamber 121, adjacent one end 123 thereof. A drain tube 125, adjacent the other end 127 of condensing chamber 121 leads out from the cabinet 5 into a main drain (not shown). A cold water supply line 131 which may be connected to identical to the supply line 71, connects to a spray nozzle 133 within the chamber 131 adjacent the end wall 123. A solenoid valve 135 in the line 131 controls the water supply to the nozzle 133.

The apparatus 1 has a control switch 141, first and second indicating lights 143 and 145 located above the switch 141, a timer 147 and a timer switch 149 mounted on the front wall 7 of the cabinet 5. The control switch 141 is a three-position switch having "off", "manual" and "automatic" positions.

Figure 4:
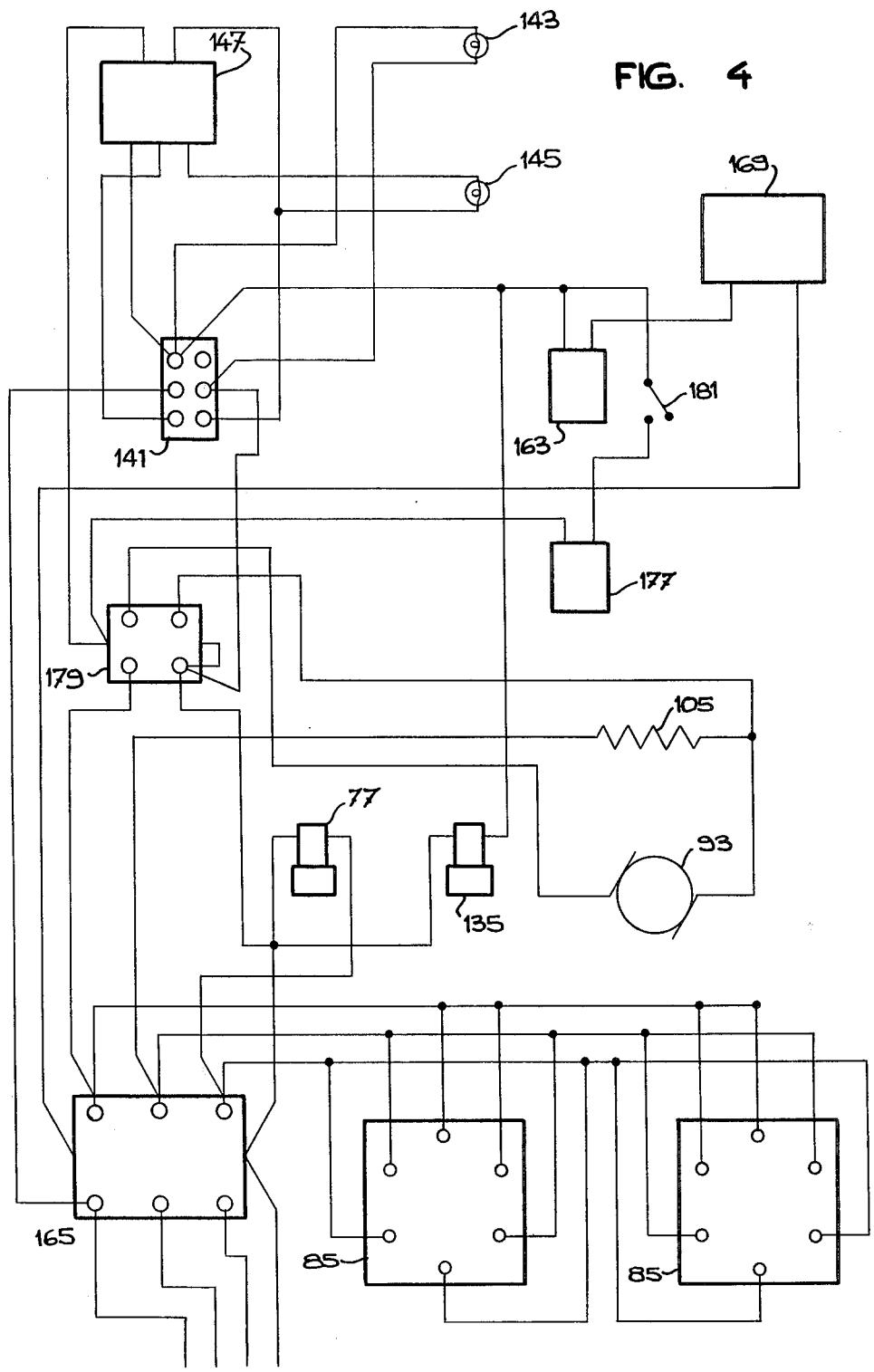
FIG. 4 is a schematic view of the operating system of the oven shown in FIG. 1.

The apparatus operates in the following manner having reference to FIG. 4 as well as FIGS. 1 to 3.

When the apparatus is turned on, to either "manual" or "automatic" operation by the control switch 141, water enters the steam generating chamber 67 through the line 71, the flow control device 75 and nozzle 73 until the solenoid valve 77 is shut by the breaker 165 as will be described hereinafter. Water also is sprayed within the chamber 131 through the line 135 and nozzle 133. The heaters 85 meanwhile are operated to heat the water in the heating chamber 83 so as to heat the water in the steam generating chamber 67 to generate steam. Steam rapidly fills the steam unit 3 and excess of steam begins to bleed off from the vent tube 111 so as to maintain substantially atmospheric operating conditions within the steam unit 3. Food is placed in the steam chamber 65 to be cooked or heated. The door 19 can be opened at any time to put in or take out food without danger.

As the excess of steam exits into the condensing chamber 121, the spray of cold water from nozzle 133 at least partially condenses it. As can be seen in FIG. 4, the valve 135 in the line 131 is opened to continually provide a water spray when the apparatus is turned on. The water spray impinges on a temperature sensor 161 within the condensing chamber 121 adjacent the end 127. The sensor 161 is connected to a thermostat 163 which controls the operation of heaters 85. If the temperature sensed by the sensor 161 is too hot, say above 110° F., either due to the steam being too hot, or to having too much steam escape, the thermostat 163 shutts off the heaters 85 via a breaker 165 for a period of time to allow the temperature to drop. Make-up water is automatically added by the breaker 165 from time to time, from the line 71 to replace the steam lost through the vent 111.

A pressure sensor 167 is provided in the heating chamber 83 to sense the pressure therein. If the pressure rises above a predetermined value, such as 35 pounds, the heaters 85 are shut off by a pressure control device 169 to which the sensor 167 is connected, until the pressure drops to an acceptable value. A pressure-relief valve 171 can also be located in the wall of the heating chamber 83, set to open at a higher pressure if the sensors 161 and 167, or their connected controls, fail to operate.

A second temperature sensor 175 is located at the top of the steam chamber 65 to sense the temperature of the steam within the chamber. When the steam temperature reaches a certain value, such as 180° F. in heating or cooking food, the sensor 175 actuates a thermostat 177 which operates the fan 93 and the heaters 105 via a breaker 179 to circulate and heat the steam to minimize condensation in the chamber 67. A switch 181, operated by the door 19, automatically shuts off the fan 93 when the door is opened.

One indicating light 143 is red in colour and is on when the machine is in operation, either on "manual" or "automatic". When the timer 147 is used, the control switch 141 is set on "automatic", the time for the unit to operate is then set on the timer 147 and the timer switch 149 is actuated. During operation of the timer, the red indicating light 143 is on. When the timer shuts off the unit, the red light 143 goes off, and the second indicating light 145, yellow in colour comes on to indicate that the cooking cycle is complete.

Figure 5:
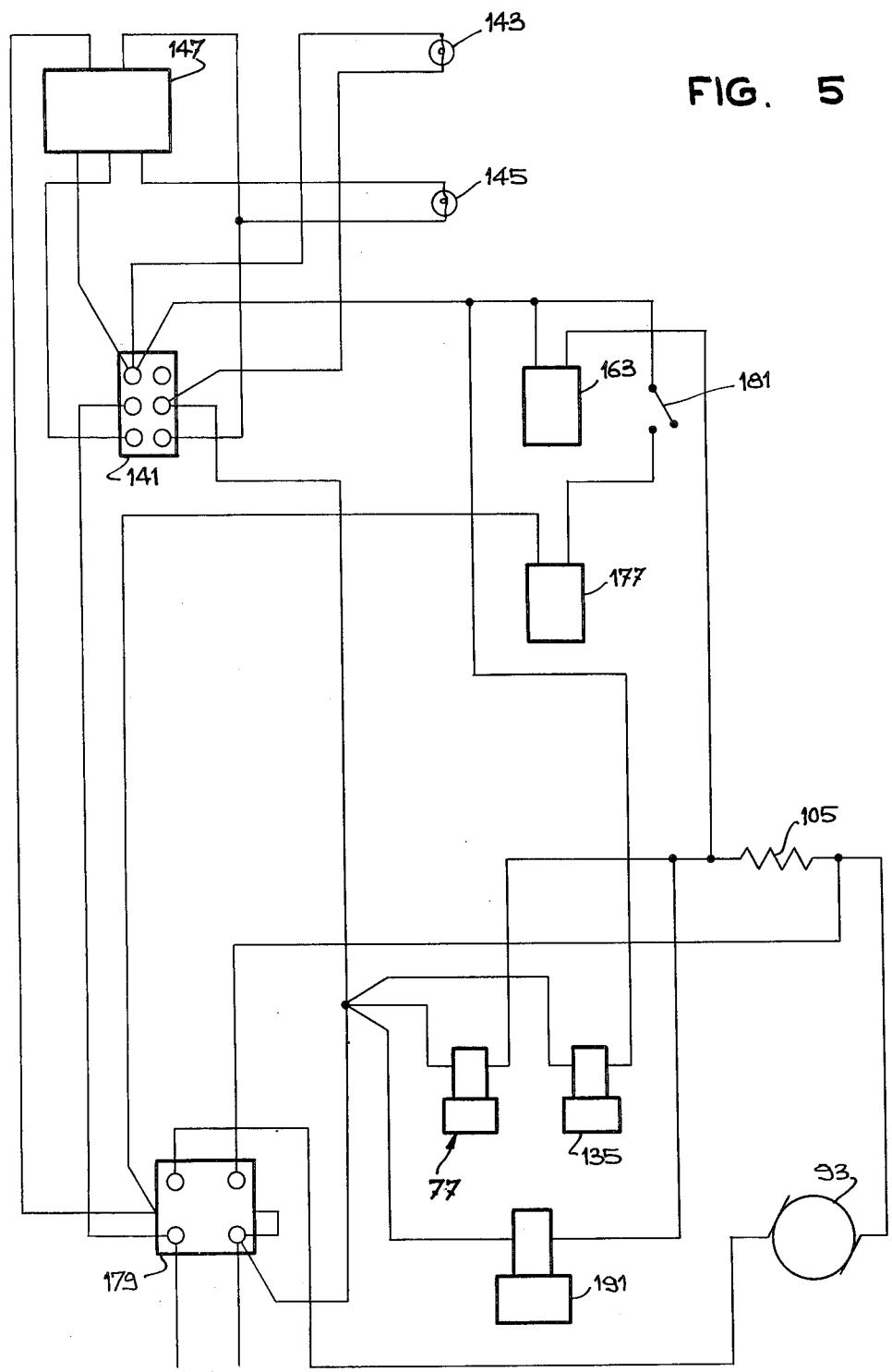
FIG. 5 is a schematic view of the operating system of another embodiment of the oven.

While the apparatus has been shown equipped with heaters 85, the latter may be eliminated and steam could be piped into the heating chamber 83 from a source (not shown) and through steam valve 191. In this case, as shown in FIG. 5, the temperature sensor 161, through the thermostat 163, controls opening or closing of the steam valve 191.

We claim:
1. An apparatus for steaming foods comprising:
 (a) a steam chamber;
 (b) means for filling the chamber with steam, said filling means comprising means for introducing liquid into the bottom of the steam chamber, and heating means outside the steam chamber for heating the liquid in the steam chamber to produce steam;
 (c) means for allowing steam to escape from the chamber to maintain substantially atmospheric conditions in the chamber;
 (d) a condensing chamber for the escaping steam;
 (e) means in the condensing chamber for spraying liquid on the steam to condense it;
 (f) means for draining the liquid and condensed steam from the condensing chamber; and
 (g) means for controlling the heating means and the filling means, said control means comprising a sensor for sensing the temperature of the water and condensed steam in the condensing chamber.

2. An apparatus as claimed in claim 1 wherein the steam escape means comprise an open vent at the bottom of the chamber.

3. An apparatus as claimed in claim 1 including means for circulating the steam in the steam chamber.

4. An apparatus as claimed in claim 3 including means for heating the circulating steam in the steam chamber.

5. An apparatus as claimed in claim 4 including temperature sensing means for sensing the temperature of the heated steam within the steam chamber, said temperature sensor controlling the operation of the heating means for the circulating steam.

6. An apparatus as claimed in claim 1 wherein the heating means comprises a closed tank with a subatmospheric pressure therein, which tank is partially filled with a liquid and positioned adjacent the bottom of the steam chamber, and heaters in the liquid.

7. An apparatus as claimed in claim 6 including pressure sensing means for sensing the pressure of steam in the closed heater tank, said pressure sensing means controlling the operation of the heaters.

8. An apparatus as claimed in claim 1 including means for operating the apparatus manually or automatically.

9. An apparatus as claimed in claim 8 including timer means for operating the apparatus automatically.

10. An apparatus for steaming foods comprising:
(a) a steam chamber;
(b) means for filling the chamber with steam, said filling means comprising means for introducing liquid into the bottom of the steam chamber, and heating means outside the steam chamber for heating the liquid in the steam chamber to produce steam;
(c) means for allowing steam to escape from the chamber to maintain substantially atmospheric conditions in the chamber;
(d) a condensing chamber for the escaping steam;
(e) means in the condensing chamber for spraying liquid on the steam to condense it;
(f) means for draining the liquid and condensed steam from the condensing chamber; and
(g) means for circulating the steam in the steam chamber.

11. An apparatus as claimed in claim 10, wherein the steam circulating means comprises a fan located in the steam chamber.

12. An apparatus as claimed in claim 11, including means for heating the circulating steam in the steam chamber.

13. An apparatus as claimed in claim 10, wherein the steam escape means comprises an open vent at the bottom.

14. An apparatus as claimed in claim 10, including means for controlling the heating means and the filling means, said control means comprising a sensor for sensing the temperature of the water and condensed steam in the condensing chamber.

15. An apparatus as claimed in claim 14, including temperature sensing means for sensing the temperature of the heated steam within the steam chamber, said temperature sensor controlling the operation of the circulating means.

16. An apparatus as claimed in claim 10, wherein the heating means comprises a closed tank with a subatmospheric pressure therein, which tank is partially filled with a liquid and positioned adjacent the bottom of the steam chamber, and heaters in the liquid.

17. An apparatus as claimed in claim 16 including pressure sensing means for sensing the pressure of steam in the closed heater tank, said pressure sensing means controlling the operation of the heaters.

18. An apparatus as claimed in claim 10 including means for operating the apparatus manually or automatically.

19. An apparatus as claimed in claim 18 including timer means for operating the apparatus automatically.

* * * * *

UNITED STATES PATENT AND TRADEMARK OFFICE
CERTIFICATE OF CORRECTION

PATENT NO. : 4,173,215
DATED : November 6, 1979
INVENTOR(S) : BUREAU, Jean Y. and CHARLEBOIS, Bernard It is certified that error appears in the above—identified patent and that said Letters Patent is hereby corrected as shown below:

On the title page, left-hand column, amend the line beginning "[73] Assignee:" by deleting "Mscan Metal Canada Limitee" and substituting therefor --Escan Metal Canada Limitee--.

Signed and Sealed this

Seventeenth Day of June 1980

[SEAL]

*Attest:*

SIDNEY A. DIAMOND

*Attesting Officer*     *Commissioner of Patents and Trademarks*